(12) United States Patent
Cheung

(10) Patent No.: US 6,833,780 B2
(45) Date of Patent: Dec. 21, 2004

(54) MECHANICAL TRANSLATOR WITH ULTRA LOW FRICTION FERROFLUID BEARINGS

(75) Inventor: Jeffrey T. Cheung, Thousand Oaks, CA (US)

(73) Assignee: Rockwell Scientific Licensing, LLC, Thousand Oaks, CA (US)

( * ) Notice: Subject to any disclaimer, the term of this patent is extended or adjusted under 35 U.S.C. 154(b) by 0 days.

(21) Appl. No.: 10/741,667

(22) Filed: Dec. 19, 2003

(65) Prior Publication Data

US 2004/0130422 A1 Jul. 8, 2004

Related U.S. Application Data

(62) Division of application No. 10/078,132, filed on Feb. 19, 2002, now abandoned.

(51) Int. Cl.[7] .................................................. H01F 7/02
(52) U.S. Cl. ....................... 335/302; 335/285; 335/306; 310/90.5
(58) Field of Search ........................ 335/285, 302–306; 310/90.5

(56) References Cited

U.S. PATENT DOCUMENTS

| | | | |
|---|---|---|---|
| 3,083,469 A | | 4/1963 | Herbat .......................... 33/215 |
| 4,604,222 A | * | 8/1986 | Borduz et al. ............. 252/62.52 |
| 4,645,960 A | * | 2/1987 | Hoffman ..................... 310/90.5 |
| 4,732,706 A | | 3/1988 | Borduz et al. ...................... 1/6 |
| 4,814,654 A | | 3/1989 | Gerfast ................... 110/154.29 |
| 4,892,798 A | * | 1/1990 | Lamanna et al. ............... 430/38 |
| 4,965,864 A | | 10/1990 | Roth et al. ................... 318/135 |
| 5,376,862 A | | 12/1994 | Stevens |
| 5,578,877 A | | 11/1996 | Tiemann ....................... 310/15 |
| 5,713,670 A | | 2/1998 | Goldowsky ................. 384/115 |

(List continued on next page.)

FOREIGN PATENT DOCUMENTS

| | | | |
|---|---|---|---|
| DE | 19810211 A | 9/1999 | |
| DE | 2011395 U1 | 1/2002 | ............ H04M/1/21 |
| EP | 206516 A2 | 12/1986 | ............ H01F/1/28 |
| FR | 2407599 A | 5/1979 | .......... H02K/35/02 |
| GB | 1504872 | 3/1978 | |
| JP | S532865 | 1/1978 | ........................ 7/6 |
| JP | S57171117 | 10/1982 | ...................... 29/2 |
| JP | S63225718 | 9/1988 | ...................... 29/2 |
| JP | 2001258234 A | 9/2001 | .......... H02K/35/04 |

OTHER PUBLICATIONS

Electric Motors and Motor Controls; Jeff Keljik; 1995; Delmar Publishers; pp. 139–142.

Calin Popa N et al: "Gravitational electrical generator on magnetic fluid cushion", Journal of Magnetism and Magnetic Materials, Elsevier Science Publishers, Amsterdam, NL, vol. 201, NR. 1–3, page(s) 407–409 XP004181287, ISSN: 0304–8853, p. 408, col. 1, line 1–3; figures 1,2 Received May 25, 1998; received in revised form Sep. 21, 1998.

Patent Abstracts of Japan, vol. 2000, No. 14, Mar. 5, 2001 & JP 2000 308327 A (Makino Tadashi Kenkyusho:KK), Nov. 2, 2000 abstract.

DE 38 41 011 A (Lewin Heinz Ulrich) Jun. 7, 1990.

*Primary Examiner*—Ramon M. Barrera
(74) *Attorney, Agent, or Firm*—Koppel, Jacobs, Patrick & Heybl

(57) ABSTRACT

A mechanical translator includes at least one magnet that is disposed on a substrate to carry a load and has a magnetic axis generally transverse to the substrate, establishing a magnetic field with maximum external density adjacent the substrate. An ultra low friction interface is obtained with ferrofluid bearings, such as a light mineral oil medium mixed with isoparaffinic acid, which establish a critical angle of displacement from a horizontal static position of less than 1 degree, and preferably less than 10 minutes. A controller of magnetic material can be placed on the opposite side of the substrate to control the movement of the magnets.

40 Claims, 2 Drawing Sheets

U.S. PATENT DOCUMENTS

| | | | |
|---|---|---|---|
| 5,775,169 A | 7/1998 | Solomon et al. | 74/490.01 |
| 5,908,987 A | 6/1999 | Raj | 73/514.09 |
| 6,083,082 A | 7/2000 | Saldana | 451/5 |
| 6,103,107 A * | 8/2000 | Raj | 210/97 |
| 6,220,719 B1 | 4/2001 | Vetorino et al. | 362/192 |
| 6,313,551 B1 | 11/2001 | Hazelton | 310/12 |
| 6,501,357 B2 | 12/2002 | Petro | 335/229 |
| 6,570,273 B2 | 5/2003 | Hazelton | 310/12 |

* cited by examiner

MECHANICAL TRANSLATOR WITH ULTRA LOW FRICTION FERROFLUID BEARINGS

RELATED APPLICATION

This application is a divisional of Ser. No. 10/078,132, filed Feb. 19, 2002 now abandoned.

BACKGROUND OF THE INVENTION

1. Field of the Invention

This invention relates to magnetic-based mechanical translators, and more particularly to mechanical translators with ferrofluid bearings.

2. Description of the Related Art

Ferrofluids are dispersions of finely divided magnetic or magnetizable particles, generally ranging between about 30 and 150 Angstroms in size, dispersed in a liquid carrier. The magnetic particles are typically covered with surfactants or a dispersing agent. The surfactants assure a permanent distance between the magnetic particles to overcome the forces of attraction caused by Van der Waal forces and magnetic interaction, and also provide a chemical composition on the outer layer of the covered particles which is compatible with the liquid carrier and the chemicals in the surrounding environment. Ferrites and ferric oxides employed as magnet particles offer a number of physical and chemical properties to the ferrofluid, including saturation magnetization, viscosity, magnetic stability and chemical stability. Several types of ferrofluids are provided by Ferrotec (USA) Corporation of Nashua, N.H. A summary of patents related to the preparation of ferrofluids is provided in U.S. Pat. No. 6,056,889, while the use of ferrofluid bearings in a moving magnet electrical generator is discussed in copending patent application Ser. No. 10/078,724, entitled "Electrical Generator With Ferrofluid Bearings", filed on the same day as the present invention by Jeffrey T. Cheung and Hao Xin, and also assigned to Innovative Technology Licensing, LLC, the assignee of the present invention. The contents of this copending application are hereby incorporated herein by reference.

A ferrofluid's frictional coefficient is roughly related to its viscosity (measured in centipoise (cp)), but not directly. For example, a ferrofluid with a viscosity of 300 cp has been found to have a static friction coefficient of about 0.015, the EFH1 ferrofluid from Ferrotec (USA) Corporation has a viscosity on the order of 6 cp and a static friction coefficient of about 0.002, but a water based ferrofluid with a viscosity of 5 cp has been found to have a static friction coefficient of about 0.01. The higher friction coefficient for the somewhat lower viscosity composition has been attributed to surface tension associated with a water based solvent.

Low friction systems can have other problems. For example, depositing a thin film over a substrate by vapor deposition is performed in a vacuum chamber by rotating and translating the substrate inside the chamber to achieve uniform deposition over a large area. The mechanism that controls this motion is cumbersome, consisting of gears, chains, and both rotary and translational motion vacuum feedthroughs. A simpler less expensive motion control for the substrates would be highly desirable.

Traditional lubricants employed to assist movement of a load bearing mechanism on a substrate, while considerably reducing the frictional forces resisting motion, still involve a considerable amount of friction. For example, whereas the static coefficient of friction between unlubricated hard steel surfaces is typically about 0.6, the corresponding coefficient is about 0.08–0.1 for vegetable and animal oil lubricants, 0.14–0.2 for mineral oils, 0.12 for graphitised oils, 0.1 for molybdenum disulfide, 0.08 for oleic acid, 0.4 for alcohol and benzene, and 0.2 for glycerine. Even lower frictional coefficients, making it easier to translate a load, would be desirable.

SUMMARY OF THE INVENTION

The present invention provides a mechanical translator system with an ultra low degree of friction, and a novel ferrofluid composition that can be used as a lubricant for the translator. The term "translation" as used herein includes both changes of position and/or rotation. In a preferred embodiment the translator includes a moveable magnet that is arranged to carry a load and is disposed for movement on a substrate. Its magnetic axis is generally transverse to the substrate, such that its magnetic field has a maximum density adjacent the substrate. A ferrofluid lubricant is preferably provided between the magnet and substrate. A ferrofluid composition that can be used to achieve a particularly low friction has a viscosity substantially less than 5 cp. It consists of a light mineral oil medium mixed with isoparaffinic acid, with the ratio of isoparaffinic acid to light mineral oil preferably in the range of about 2:1 to about 4:1. The resulting coefficient of static friction has been found to be in the approximate range of 0.0008–0.0012.

A plurality of moveable magnets, each with a magnetic axis generally transverse to the substrate, can be used to support a platform upon which a load can be placed, or which itself can comprise a load. The magnets are preferably connected to respective fixed locations on the platform, which can be formed from a magnetic material, or a non-magnetic material which might include an alloy that shields magnetic fields. A ferrofluid lubricant is provided between the magnets and substrate for ultra low frictional movement. A ferrofluid with a low vapor pressure should be selected for environments in which other ferrofluids tend to dry out.

When applied to vapor deposition apparatus, the moveable magnets are disposed on the floor of a vacuum chamber which includes a vapor source for depositing a thin film on a substrate carried by the platform. A controller formed from a magnetic material outside the vacuum chamber, on the opposite side of the floor from the moveable magnets, controls the movement of the magnets and platform to achieve uniform deposition, eliminating the need for the cumbersome control equipment and its mechanical communication through the vacuum chamber that were previously required.

These and other features and advantages of the invention will be apparent to those skilled in the art from the following detailed description, taken together with the accompanying drawings.

DETAILED DESCRIPTION OF THE INVENTION

Figure 1:
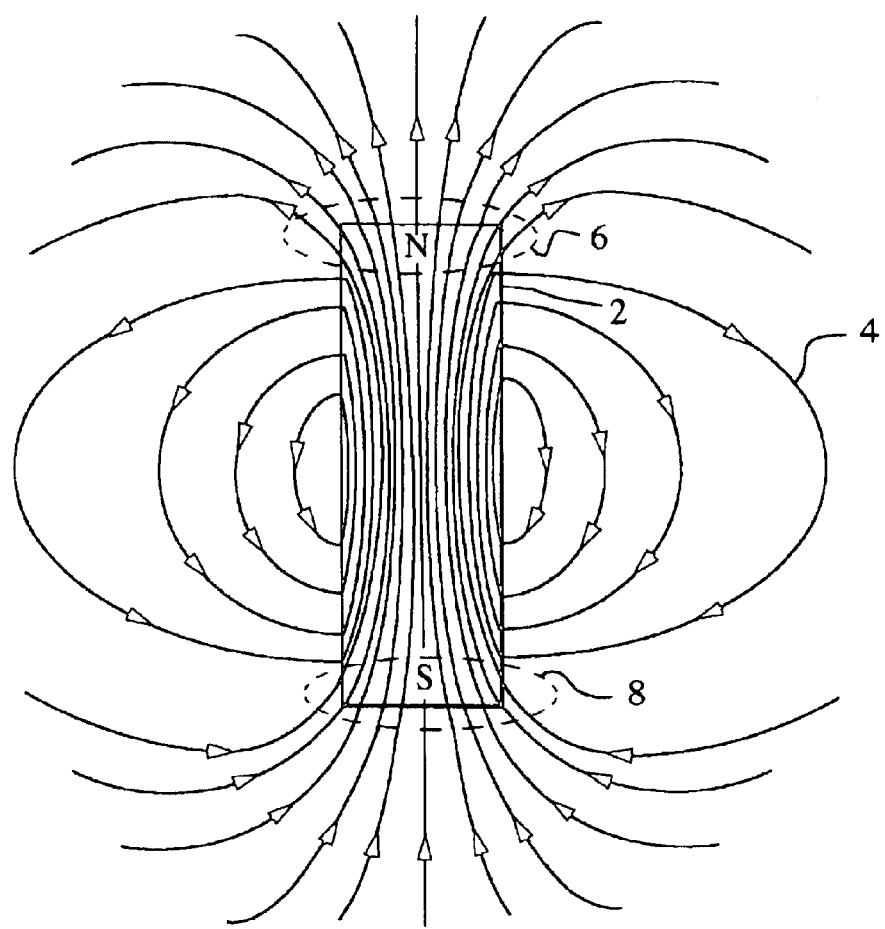
FIG. 1 is a diagram illustrating the magnetic field lines associated with a bar magnet.

FIG. 1 illustrates a bar magnet 2 and its associated magnetic field lines 4. As is well known, the field lines radiate out mostly from the magnet's north pole, and loop around to return to the magnet's south pole. The greatest magnetic field concentrations external to the magnet are at its opposite poles, and it is in these regions that a ferrofluid will tend to accumulate when the ferrofluid is presented to the magnet. The ferrofluid concentration formed at the opposite ends of the magnet, indicated by dashed ovals 6 and 8 around the north and south magnet poles, respectively, can be used as bearings to provide a lubricated movement of the magnet along a surface. Ferrofluid bearings would also tend to form at the opposite ends of an electro-magnet as well as a permanent magnet.

Figure 2:
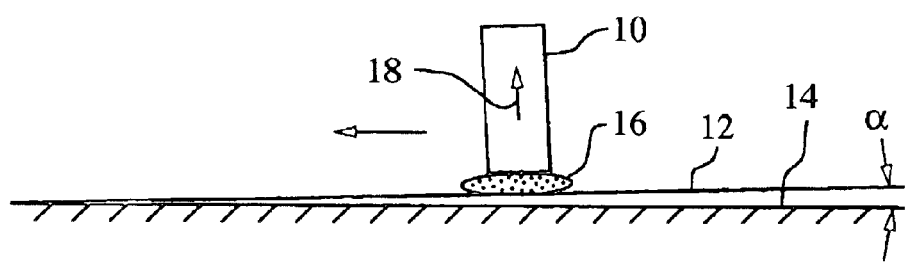
FIG. 2 is a diagram illustrating the ultra low friction achieved with a ferrofluid lubricant in accordance with one aspect of the invention.

Referring now to FIG. 2, a magnet 10 is shown supported on a substrate 12, which in turn is on a horizontal support surface 14. A ferrofluid bearing 16 provides an ultra low friction interface between the magnet 10 and substrate 12. The magnet is oriented with its magnetic axis 18 generally transverse to the substrate 12. Thus, the magnet's magnetic field has it maximum external density adjacent the substrate. Although for purposes of this invention the magnet's magnetic axis will normally be orthogonal to substrate 12, it can also be tilted at an angle up to about 45° from a perpendicular to the substrate, preferably with a corresponding chamfer at the end of the magnet adjacent the substrate.

With the use of an appropriate ferrofluid 16 between the substrate and magnet, ultra low degrees of friction can be achieved between the magnet and substrate, making the magnet highly responsive to a tilting of the substrate or a translational force applied to the magnet. Presently available ferrofluids from Ferrotec (USA) Corporation are among those that can be used as low friction bearings. For example, a water based ferrofluid designated EMG805 has a coefficient of static friction of about 0.01 and a viscosity of about 5 cp, while a light mineral oil ferrofluid composition designated EFH1 has a coefficient of static friction of about 0.002 and a viscosity slightly on the order of 6 cp.

Even lower levels of friction can be achieved with a new formulation in which the light mineral oil EFH1 ferrofluid is mixed (preferably for about 24 hours) with isoparaffinic acid. Two sources of isoparaffinic acid at present are Isopar M and Isopar G hydrocarbon fluids, both from ExxonMobil Chemical Corporation; both appear to work equally well. With a ratio of isoparaffinic acid to EFH1 light mineral oil ferrofluid in the range of approximately 2:1 to 4:1, ultra low static coefficients of friction in the range of 0.0008–0.0012 were achieved. The viscosity of the mixture was significantly less than 2 cp, on the order of 1 cp. While the mixture's static friction coefficient was even lower than for the EFH1 ferrofluid by itself, the EFH1 composition has a somewhat greater load bearing capability.

The static friction coefficient was measured by raising one end of the substrate 12 off the horizontal surface 14 until a mass supported by the ferrofluid began to slide along the substrate, determining the substrate's critical off-horizontal angle of displacement at which sliding movement began, returning the substrate to horizontal, lifting its other end until the mass started to slide in the opposite direction, determining the critical angle of displacement from horizontal for sliding to begin in that direction, and averaging the two angles. With the preferred EFH1/isoparaffinic acid mixture, the mass began to slide at an average angle of much less than 1 degree, and even considerably less than 10 minutes. In fact, the critical angle for displacement from a horizontal static position was found to be approximately 0.07 degree.

Figure 3A:
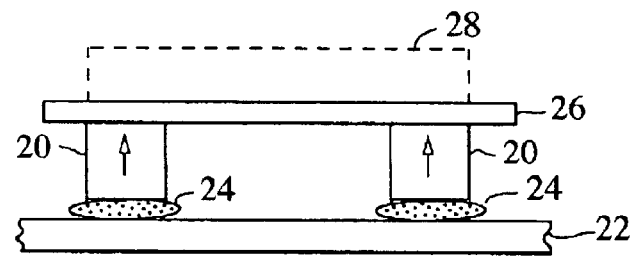
FIGS. 3a and 3b are respectively frontal and side elevation views of a low friction, load bearing mechanical translator in accordance with the invention.
Figure 3B:
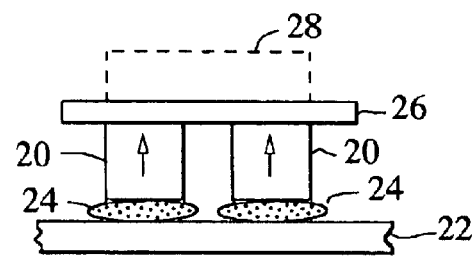

FIGS. 3a and 3b illustrate the invention applied to an ultra low friction translatable load bearing platform. A set of magnets 20 are disposed with their magnetic axes generally transverse to a substrate 22, with one end of the magnets provided with ferrofluid bearings 24 for ultra low friction movement over the substrate, and the other end of the magnets attached to a load bearing platform 26. A load to be carried by the platform is indicated by dashed lines 28. The shape and size of the platform, as well as the number of magnetic posts, are arbitrary and can be chosen depending upon the load to be placed on the platform. The platform can be formed from a magnetic material so that it diffuses the magnetic field, leaving the strongest field location at the opposite end of the magnet adjacent the substrate. This tends to concentrate the ferrofluid away from the platform and towards the bottom of the magnet, where it functions as a lubricant for magnet movement over the substrate. The platform can also be formed from a non-magnetic material. Another option is to form the platform from a nonmagnetic alloy that provides effective shielding of the magnetic field, thereby creating a zone above the platform which is free of magnetic flux. Such a material is available from Spang & Company Corp. under the trademark MUMETAL. The magnet posts can be attached to the platform by mechanical devices such as clamps, bolts or adhesives.

The ferrofluid solution is applied to the bottom of the posts where, because of their magnetic property, they bond strongly to engulf the post bottoms. The platform thus rests on ferrofluid "cushions", without a direct contact between the magnets and substrate. Because of the low friction achievable with ferrofluid bearings, the platform can be pushed to move freely with a slight force. The movement can be controlled by either applying it directly to the platform and/or magnets, or by moving a magnetic control object (formed from either a magnetized or a magnetizable material) on the other side of the substrate. The movement of the platform can be controlled remotely by moving the external controller on the opposite side of the substrate, without making any direct contact to the platform assembly itself.

Figure 4:
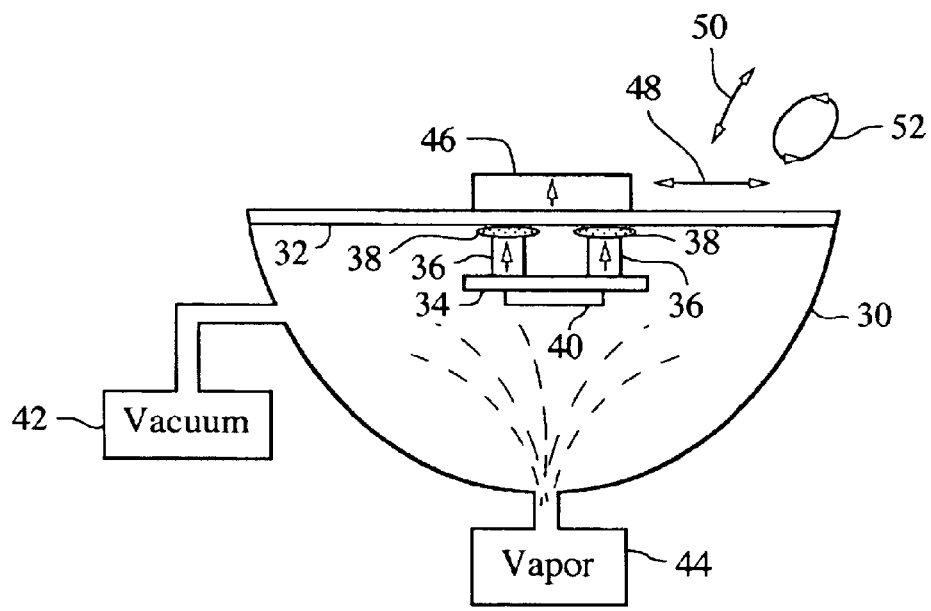
FIG. 4 is a diagram of a vapor deposition chamber using one embodiment of a mechanical translator in accordance with the invention.

An application for this type of motion control is a vapor deposition chamber, illustrated in FIG. 4. The chamber consists of a vacuum enclosure 30, the floor 32 of which comprises a substrate upon which a load bearing platform 34 moves via attached magnets 36 and ferrofluid bearings 38. As illustrated, the magnets 36 in FIG. 4 have a magnetic polarity opposite to that illustrated in FIGS. 3a and 3b; the choice is arbitrary. A substrate 40 upon which a thin film is to be deposited is placed on the platform 34.

The chamber is evacuated a vacuum pump 42, while a vapor source generically indicated by reference number 44 provides a material to be deposited on the substrate. In practice, the vapor deposition process can take several forms, such as thermal evaporation, e-beam evaporation or different forms of sputtering. These all require that the substrate holder be able to rotate and translate inside the vacuum chamber to achieve a uniform deposition over a large substrate area. The prior need for gears, chains, and both rotary and translational motion vacuum feedthroughs are eliminated with the use of an external magnetized or magnetizable control mass 46, placed on the opposite side of substrate 32 from the platform 34 and aligned with its support magnets. The external controller 46 can be translated in an x-y plane, as indicated by arrows 48 and 50, or rotated as indicated by circular arrow 52, imparting a corresponding movement to the interior magnets and the platform they support. The external controller 46 is preferably a single mass which encompasses the area subtended by the interior magnets 38, or can equivalently be an array of separate controllers aligned with the individual magnets 36 and moved together. The platform and the substrate which it carries can be rotated and translated over a large area simply by imparting the same movements to the easily accessible external controller. If the controller is magnetized, its polarity should be oriented in the same direction as the internal magnets for mutual attraction.

APG S10 grade ferrofluid from Ferrotec (USA) Corporation was used for the vapor deposition application because of its low vapor pressure, which allows it to be used in a vacuum or ambient atmosphere with a long operational lifetime. Some other ferrofluids have a tendency to dry out in this environment. A 7.6 cm diameter platform with four 0.95 cm diameter, 6.4 cm length, Grade 30 NdFeB magnets, cushioned by the APG S10 grade ferrofluid, was found to be capable of supporting a 250 gram load, while maintaining a low static coefficient of friction in the range 0.01–0.02. While not as low as the other ferrofluid compositions discussed above, this value was still considerably lower than traditional lubricants.

In addition to providing a lower level of friction, the use of a ferrofluid allows the movement of the platform to be controlled externally by a moving magnet body. With traditional lubricants, placing a magnet on the opposite side of the wall from the platform can attract the platform's magnet posts strongly enough that the lubricant is squeezed out, leaving the posts in a direct high friction contact with the wall. However, due to the attraction between the magnet posts and the magnetic nanoparticles in a ferrofluid, a cushion of ferrofluid lubricant will remain between the magnet posts and the chamber wall.

While various embodiments of the invention have been shown and described, numerous variations and alternate embodiments will occur to those skilled in the art. Accordingly, it is intended that the invention be limited only in terms of the appended claims.

I claim:

1. A mechanical translator, comprising:
   a substrate, and
   a magnet disposed for movement on said substrate, said magnet arranged to carry a load and having a magnetic axis generally transverse to said substrate, with a surface of the magnet facing said substrate, and
   a ferrofluid concentrated between said magnet and said substrate, said ferrofluid extending across and in direct contact with said magnet surface to provide a low friction area support for said magnet to translate across said substrate,
   wherein said translator has a critical angle of displacement from a horizontal static position of less than 1 degree.

2. The mechanical translator of claim 1, wherein said critical angle is less than 10 minutes.

3. The mechanical translator of claim 1, wherein said ferrofluid includes a light mineral oil medium.

4. The mechanical translator of claim 3, said ferrofluid further comprising isoparaffinic acid mixed with said light mineral oil.

5. The mechanical translator of claim 1, said ferrofluid having a viscosity less than 5 cp.

6. A mechanical translator comprising:
   a substrate,
   a magnet disposed for movement on said substrate, said magnet arranged to carry a load and having a magnetic axis generally transverse to said substrate, with a surface of the magnet facing said substrate,
   a ferrofluid concentrated between said magnet and said substrate, said ferrofluid extending across and in direct contact with said magnet surface to provide a low friction area support for said magnet to translate across said substrate, and
   a controller of magnetic material on the opposite side of said substrate from said magnet, said controller controlling the movement of said magnet.

7. The mechanical translator of claim 6, said substrate comprising a portion of an enclosure, with said magnet inside and said controller outside said enclosure.

8. A mechanical translator, comprising:
   a substrate,
   a magnet disposed for movement with respect to said substrate with a surface of said magnet facing said substrate, said magnet arranged to carry a load and establishing a magnetic field which has its maximum external density adjacent said substrate, and
   a ferrofluid concentrated between said magnet and said substrate, said ferrofluid extending across and in direct contact with said magnet surface to provide a low friction area support for said magnet to translate across said substrate,
   wherein said translator has a critical angle of displacement from a horizontal static position of less than 1 degree.

9. The mechanical translator of claim 8, wherein said critical angle is less than 10 minutes.

10. The mechanical translator of claim 8, wherein said ferrofluid includes a light mineral oil medium.

11. The mechanical translator of claim 10, said ferrofluid further comprising isoparaffinic acid mixed with said light mineral oil.

12. The mechanical translator of claim 8, said ferrofluid having a viscosity less than 5 cp.

13. A mechanical translator comprising:
    a substrate,
    a magnet disposed for movement with respect to said substrate with a surface of said magnet facing said substrate, said magnet arranged to carry a load and establishing a magnetic field which has its maximum external density adjacent said substrate,
    a ferrofluid concentrated between said magnet and said substrate, said ferrofluid extending across and in direct contact with said magnet surface to provide a low friction area support for said magnet to translate across said substrate, and
    a controller of magnetic material on the opposite side of said substrate from said magnet, said controller controlling the movement of said magnet.

14. The mechanical translator of claim 13, said substrate comprising a portion of an enclosure, with said magnet inside and said controller outside said enclosure.

15. A mechanical translator, comprising:
    a substrate,
    a plurality of magnets disposed for movement on said substrate and carrying a platform, said magnets having respective magnetic axes generally transverse to said substrate, with a respective surface of each magnet facing said substrate, and a ferrofluid concentrated between each magnet and said substrate, said ferrofluid extending across and in direct contact with said respective surface of each magnet to provide respective low friction area supports for said magnets to translate across said substrate.

16. The mechanical translator of claim 15, wherein said magnets are connected to respective fixed locations on said platform.

17. The mechanical translator of claim 15, said platform comprising a magnetic material.

18. The mechanical translator of claim 15, said platform comprising a nonmagnetic material.

19. The mechanical translator of claim 18, said platform comprising a magnetic field shielding alloy.

20. The mechanical translator of claim 15, wherein said translator has a critical angle of displacement from a horizontal static position of less than 1 degree.

21. The mechanical translator of claim 20, wherein said critical angle is less than 10 minutes.

22. The mechanical translator of claim 15, further comprising a controller of magnetic material on the opposite side of said substrate from said magnets and platform, said controller controlling the movement of said magnets and platform.

23. The mechanical translator of claim 22, said substrate comprising a portion of an enclosure, with said magnets and platform inside said enclosure and said controller outside.

24. A mechanical translator, comprising:
a substrate,
a plurality of magnets disposed for movement with respect to said substrate and carrying a platform, said magnets establishing respective magnetic fields which have their maximum external densities adjacent said substrate, and
a ferrofluid concentrated between each magnet and said substrate, said ferrofluid extending across and in direct contact with said respective surface of each magnet to provide respective low friction area supports for said magnets to translate across said surface.

25. The mechanical translator of claim 24, wherein said magnets are connected to respective fixed locations on said platform.

26. The mechanical translator of claim 24, said platform comprising a magnetic material.

27. The mechanical translator of claim 24, said platform comprising a nonmagnetic material.

28. The mechanical translator of claim 27, said platform comprising a magnetic field shielding alloy.

29. The mechanical translator of claim 24, wherein said translator has a critical angle of displacement from a horizontal static position of less than 1 degree.

30. The mechanical translator of claim 29, wherein said critical angle is less than 10 minutes.

31. The mechanical translator of claim 24, further comprising a controller of magnetic material on the opposite side of said substrate from said magnets and platform, said controller controlling the movement of said magnets and platform.

32. The mechanical translator of claim 31, said substrate comprising a portion of an enclosure, with said magnets and platform inside said enclosure and said controller outside.

33. Vapor deposition apparatus, comprising:
a vacuum chamber having a floor,
at least one magnet disposed for movement on said floor and carrying a platform for a substrate, each magnet having a magnetic axis generally transverse to said floor, with a respective surface of each magnet facing said floor,
a ferrofluid concentrated between each said magnet and said floor, said ferrofluid extending across and in direct contact with said respective surfaces of each magnet to provide respective low friction area supports for said magnets to translate across said floor,
a vapor source for depositing a thin film on a substrate carried by said platform, and
a controller of magnetic material outside said chamber on the opposite side of said floor from said magnets, said controller arranged to translate to impart a corresponding translation to said magnets and platform.

34. The vapor deposition apparatus of claim 33, wherein said translator has a critical angle of displacement from a horizontal static position of less than 1 degree.

35. The vapor deposition apparatus of claim 34, wherein said critical angle is less than 10 minutes.

36. A mechanical translator, comprising:
a substrate,
at least one magnet disposed for movement on said substrate and arranged to carry a load, each magnet having a magnetic axis at an angle of at least 45° to said substrate and a critical angle of displacement from a horizontal static position of less than 1 degree, with a surface of the magnet facing said substrate, and
a ferrofluid disposed between each said magnet and said substrate, said ferrofluid extending across and in direct contact with each said magnet surface to provide a low friction area support for each said magnet to translate across said substrate.

37. The mechanical translator of claim 36, wherein said critical angle is less than 10 minutes.

38. The mechanical translator of claim 36, comprising a plurality of said magnets carrying a common load platform.

39. The mechanical translator of claim 36, further comprising a controller of magnetic material on the opposite side of said substrate from said at least one magnet, said controller controlling the movement of said at least one magnet.

40. The mechanical translator of claim 39, said substrate comprising a portion of an enclosure, with said at least one magnet inside and said controller outside said enclosure.

* * * * *